US012128696B2

(12) United States Patent
Klages et al.

(10) Patent No.: US 12,128,696 B2
(45) **Date of Patent: *Oct. 29, 2024**

(54) TECHNIQUE FOR MARKING A PROLATE OBJECT

(71) Applicant: Phoenix Contact GmbH & Co. KG, Blomberg (DE)

(72) Inventors: Kilian Klages, Detmold (DE); Alexander Hofmann, Hameln (DE); Markus Traenkle, Dauchingen (DE); Markus Kiefer, Freiburg (DE); Benjamin Pradel, Lage (DE); Bianca Hanselle, Paderborn (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 255 days.

This patent is subject to a terminal disclaimer.

(21) Appl. No.: 17/765,006

(22) PCT Filed: Oct. 6, 2020

(86) PCT No.: PCT/EP2020/077967
§ 371 (c)(1),
(2) Date: May 31, 2022

(87) PCT Pub. No.: WO2021/069422
PCT Pub. Date: Apr. 15, 2021

(65) Prior Publication Data

US 2022/0410587 A1 Dec. 29, 2022

(30) Foreign Application Priority Data

Oct. 9, 2019 (BE) .................................. 2019/5665

(51) Int. Cl.

| | |
|---|---|
| ***B41J 3/407*** | (2006.01) |
| ***B41J 2/32*** | (2006.01) |
| ***B41J 29/393*** | (2006.01) |

(52) U.S. Cl.
CPC .............. *B41J 3/4073* (2013.01); *B41J 2/32* (2013.01); *B41J 29/393* (2013.01)

(58) Field of Classification Search
None
See application file for complete search history.

(56) References Cited

U.S. PATENT DOCUMENTS 5,398,561 A * 3/1995 Tamura ................. H01R 43/28
73/865.9
5,843,252 A 12/1998 Murphy
(Continued)

FOREIGN PATENT DOCUMENTS

JP 07335050 A * 12/1995
WO WO-2018158359 A1 * 9/2018 ............ G01B 11/04

OTHER PUBLICATIONS

Machine translation of Hayashi et al. (Year: 1995).*
Machine translation of Hanzel et al. (Year: 2018).*

*Primary Examiner* — Matthew G Marini
(74) *Attorney, Agent, or Firm* — LEYDIG, VOIT & MAYER, LTD.

(57) ABSTRACT

A device for arranging a marking circumferentially closed around a prolate object, or for providing a marking arrangeable circumferentially closed around a prolate object, includes: a material interface for receiving a print medium printed by a printer as a printed product; a data interface for communicating with the printer for arranging or providing the marking; at least one sensor for acquiring control signals that imply or indicate at least one measurand of the object to be marked, the at least one sensor being in data communication with the data interface; and at least one actuator for arranging the marking on the object in a circumferentially closed manner or providing the marking for circumferen-
(Continued)

tially closed arrangement in accordance with the communication via the data interface and by the printed product output by the printer.

20 Claims, 8 Drawing Sheets

(56) References Cited

U.S. PATENT DOCUMENTS

| | | | | |
|---|---|---|---|---|
| 2003/0146943 | A1 | 8/2003 | Lehmkuhl et al. | |
| 2004/0211522 | A1* | 10/2004 | Fries | B65C 3/02 156/443 |
| 2007/0029386 | A1* | 2/2007 | Jessup | G06K 1/18 235/440 |
| 2007/0121769 | A1* | 5/2007 | Gabrielson | G01S 7/52025 375/354 |
| 2008/0073023 | A1 | 3/2008 | Fries et al. | |
| 2015/0161558 | A1* | 6/2015 | Gitchell | G06Q 50/22 235/375 |
| 2023/0007907 | A1* | 1/2023 | Klages | B65C 3/02 |

* cited by examiner

TECHNIQUE FOR MARKING A PROLATE OBJECT

CROSS-REFERENCE TO PRIOR APPLICATIONS

This application is a U.S. National Phase application under 35 U.S.C. § 371 of International Application No. PCT/EP2020/077967, filed on Oct. 6, 2020, and claims benefit to Belgian Patent Application No. BE2019/5665, filed on Oct. 9, 2019. The International Application was published in German on Apr. 15, 2021 as WO/2021/069422 under PCT Article 21(2).

FIELD

The invention relates to a technique for marking a prolate object, for example a conductor. In particular, the invention relates to a device for arranging a marking circumferentially closed around the object or providing a marking arrangeable circumferentially closed around the object.

BACKGROUND

Label printers are conventionally used for the marking (i.e., labeling) of, for example, electrical conductors, which print a label which then has to be mounted on the conductor by manual work after printing. Document US 2003/146943 A1 describes a printer that alternately prints and cuts a label.

Furthermore, special printers are known which may be used for marking conductors. Document US 2004/0211522 A1 describes a machine that winds a pre-printed wrap-around label on a spindle roll around a conductor. Document US 2008/0073023 A1 describes a monolithic machine for printing and applying wrap-around labels.

However, conventional devices may only print certain labels and, if an automated application is integrated, then no other printing applications are possible with such a device.

Document U.S. Pat. No. 5,843,252 A describes a label printer and label applicator system that measures a conveying speed and a height of a package. The height of the respective package has no influence on the labels to be printed and is used to adjust the print head.

However, it is important for the arrangeability or a firm fit of a circumferentially closed marking that it is adapted to the respective object.

SUMMARY

In an embodiment, the present invention provides a device for arranging a marking circumferentially closed around a prolate object, or for providing a marking arrangeable circumferentially closed around a prolate object, comprising: a material interface configured to receive a print medium printed by a printer as a printed product; a data interface configured to communicate with the printer for arranging or providing the marking; at least one sensor configured to acquire control signals that imply or indicate at least one measurand of the object to be marked, the at least one sensor being in data communication with the data interface; and at least one actuator configured to arrange the marking on the object in a circumferentially closed manner or to provide the marking for circumferentially closed arrangement in accordance with the communication via the data interface and by the printed product output by the printer.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
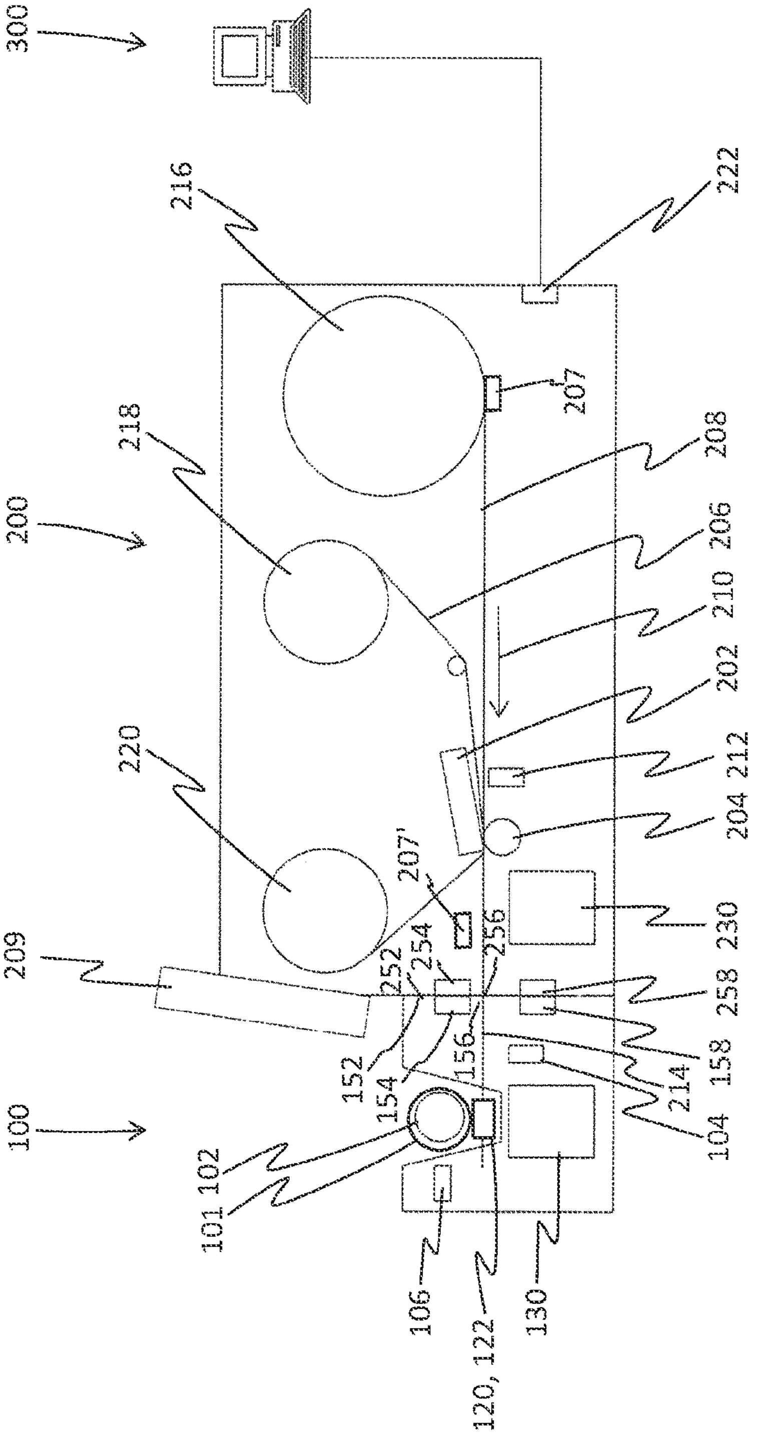
FIG. 1 is a schematic sectional view of a first embodiment of a device for arranging or providing a marking attached to an embodiment of a printer.

In an embodiment, the present invention provides a device for a printing system, preferably with the size and portability of a desktop device, so that the system may be converted in a short time to different applications of object marking, preferably different applications of conductor marking. An embodiment arranges, or provides for arrangement, a suitable marking for each different object.

A first aspect relates to a device for arranging a marking circumferentially closed around a prolate object, preferably around a conductor, or for providing a marking arrangeable circumferentially closed around a prolate object, preferably around a conductor. The device comprises a material interface configured to receive a printed medium printed by a printer as a printed product; a data interface configured to communicate with the printer for arranging or providing the marking; at least one sensor configured to acquire control signals that imply or indicate at least one measurand (or measured variable) of the object to be marked, the at least one sensor being in data communication with the data interface; and at least one actuator configured to arrange the marking on the object in a closed circumferential manner, or to provide the marking for closed circumferential arrangement, by means of the printed product output by the printer and in accordance with the communication via the data interface.

By sending the at least one measurand (for example as a data signal or as a control signal, preferably as a raw signal of the sensor) of the object (preferably of the conductor) to the printer via the data interface, embodiments of the device may prevent the output of a non-matching printed product and/or the marking of an object (preferably conductor) that does not match the print job of the printer. This may prevent waste of printing material and print medium, or may prevent that markings are incorrectly assigned to the objects.

The communication via the data interface may comprise control signals, for example, the control signals for the at least one measurand, the at least one measurand, parameters (e.g., a length) calculated from the control signals for the at least one measurand for printing the print medium or arranging the marking, an instruction to perform an action on the part of the device or the printer, and/or feedback on completion of the action on the part of the device or the printer.

The device may further comprise a control unit and/or a regulating unit via which the at least one sensor is in data connection with the data interface. The control unit and/or the regulating unit may be configured to calculate a length from the control signals for the at least one measurand of the object and to send the calculated length to the printer via the data interface.

The control unit and/or the regulating unit may be configured or adapted to configure the printer for printing the print medium depending on a measurand (or measured variable) of the object. Alternatively or additionally, the control unit and/or the regulating unit may be configured to control and/or regulate the at least one actuator for arranging or providing the marking according to the communication via the data interface.

The control signals sent to the printer via the data interface for the at least one measurand of the object or the calculated length sent to the printer via the data interface may be a preset or specification (e.g., a set value for a control unit of the printer) of the printed product of the printer received at the material interface. Alternatively or additionally, the control signals sent to the printer via the data interface for the at least one measured variable of the object or the calculated length sent to the printer via the data interface may control or preset a selection of the print medium and/or a printing material used for printing the print medium.

The control signals for the at least one measurand (or measured variable) of the object may be sent directly to the printer, for example to a control unit or regulating unit of the printer, via the data connection of the at least one sensor. The control unit or regulating unit of the printer may be configured to calculate a length from the control signals for the at least one measurand of the object.

The control unit or regulating unit of the printer may be configured to control or regulate the printing on the print medium, preferably a size of a marking information printed on the print medium and/or a length of the printed product, according to the calculated length or the length received via the data interface.

The sensor signals for measuring the object and/or the calculated length may control or specify a length of the marking, a printing length on the printed product, and/or a font size on the printed product.

The at least one measurand of the object may comprise a diameter and/or circumference of the object, preferably a diameter or circumference of the conductor.

A font line of the arranged or arrangeable marking may be aligned parallel to a longitudinal axis of the prolate object, preferably the conductor. A font height of the font line may scale with (for example, be scaled by the control unit of the printer) and/or be less than or equal to the at least one measured size of the object or the calculated length. The font height may scale with the diameter and/or be less than or equal to the diameter.

The at least one sensor may be configured to capacitively, resistively, and/or optically acquire the at least one measurand of the object to be marked.

The device may further comprise a mechanism configured to fix (or hold) the prolate object in spatial association with the at least one actuator for arranging the marking. The at least one sensor may be configured to acquire the at least one measurand of the object to be marked based on a position of the mechanical system.

The at least one sensor for acquiring control signals for the at least one measurand of the object to be marked may be coupled to a mechanism. For example, the device may comprise a mechanism for fixing (or holding) the prolate object, such as for clamping the conductor. The sensor may acquire the at least one measurand based on a position of the mechanism, for example, based on a distance between clamping jaws that fix (or hold) the prolate object.

The at least one measurand of the object may indicate or imply a size (for example, a linear, planar, and/or spatial extent) of the object.

Alternatively or additionally, the at least one sensor may be configured to acquire a mechanical hardness and/or an electrical conductivity of the prolate object, preferably the conductor. The at least one measurand may comprise the mechanical hardness and/or the electrical conductivity.

The mechanical hardness of the object may correspond to an elasticity or plasticity of the object. The mechanical hardness and/or electrical conductivity may be sent to the printer via the data interface, for example directly from the sensor or via the control unit of the device.

For example, an actuator of the mechanical system for fixing (or holding) the object may apply different compressive forces to the object (preferably by means of the clamping jaws), whereby the hardness (preferably elasticity or plasticity) of the object is calculated (preferably by the control unit) based on corresponding different positions of the mechanical system (preferably different distances of the clamping jaws).

The printer may decide, based on the measurand (preferably the diameter, mechanical hardness, and/or electrical conductivity), whether a print medium loaded in the printer is compatible with the at least one measurand, for example, whether the diameter of the object is smaller than a diameter (preferably inner diameter) of a tube used as the print medium. Alternatively or additionally, the printer may decide whether the object is compatible with the print data based on the measurand (preferably the diameter, mechanical hardness, and/or electrical conductivity).

The device may further comprise a sensor, preferably an optical sensor, configured to acquire (preferably at the material interface) an identifier on the printed product printed by the printer onto the print medium.

The identifier may comprise a marking or label comprising letters and/or digits, for example a designation in plain text.

The printed identifier on the printed product may be acquired optically and/or without contact. The sensor for acquiring the printed product (i.e., for acquiring the printed product identifier) may comprise a line scanner or a camera.

The printed material may further comprise a transponder. The device may further comprise a sensor (preferably a near-field electromagnetic communication sensor) configured to read, preferably wirelessly and/or without contact, an identifier of the transponder at the material interface.

The sensor for reading the transponder may also be referred to as a reading unit. The reading unit may be configured to read out the identification of the transponder by means of alternating magnetic fields or (preferably high-frequency) radio waves, for example as radio frequency identification (RFID). The alternating fields or radio waves generated by the reading unit may supply the transponder with energy at least during the reading of the identifier.

The transponder may be connected to the printed product by a material or adhesive bond, for example the transponder may be embedded in a surface of the print medium.

The at least one sensor for acquiring and/or reading the identifier may be in data connection with the data interface, preferably for sending the acquired and/or read identifier to the printer via data interface.

Furthermore, the device may comprise a control unit and/or a regulating unit (for example, the aforementioned control unit and/or regulating unit), via which the at least one sensor for acquiring and/or reading the identifier is in data connection with the data interface. The control unit and/or the regulating unit may be configured to determine success or failure of the acquisition and/or readout and/or to determine a quality of the acquired and/or readout identifier. The control unit and/or the regulating unit may be configured to send the determined success or failure and/or the determined quality to the printer via the data interface, preferably to its control unit and/or control unit.

Control signals (e.g., indicative) of the acquired and/or read-out identifier may be sent directly to the printer, for example to a control unit or regulating unit of the printer, via the data link of the at least one sensor for acquiring and/or reading out the identifier. The control unit or regulating unit of the printer may be configured to determine success or failure of the acquisition and/or readout and/or to determine a quality of the acquired and/or readout identifier and/or to compare the acquired and/or readout identifier with print data on which the output of the printed product is based.

The printer may further comprise a display and/or an acoustic signal generator. The control unit or regulating unit of the printer may be configured to output, on the display and/or by means of the acoustic signal generator, the determined success or failure and/or the determined quality and/or a match or deviation determined during comparing (or matching) between the detected and/or read identification and the print data. Alternatively or additionally, the control unit or regulating unit of the printer may be configured to repeat the printing of the print medium and the output of the printed product in response to the determined failure, a determined quality lower than a minimum quality and/or the determined deviation.

A second aspect relates to a printer for outputting a printed product to a device for arranging a marking circumferentially closed around a prolate object, preferably around a conductor, or for providing a marking arrangeable circumferentially closed around a prolate object, preferably around a conductor, according to an embodiment of the device aspect (i.e., the first aspect). The printer comprises a material interface configured to output a print medium printed by the printer as a printed product; a data interface configured to communicate with the device for arranging or providing the marking; and a control unit or regulating unit configured to acquire control signals of at least one sensor of the device communicated via the data interface, which imply or indicate at least one measurand of the object to be marked, or to acquire the at least one measurand of the object to be marked communicated via the data interface. Furthermore, the printer comprises a print head and a print roller (platen roller of the printer) which are controlled or regulated by the control unit or regulating unit, according to the communication via the data interface, to print on a print medium inserted in the printer and to output it as a printed product at the material interface.

The printer may further comprise a mechanical interface for selectively mounting (e.g., assembling and disassembling) the device. Alternatively or additionally, the printer may comprise a user interface, preferably including a display and/or an audible signal generator. Alternatively or additionally, the printer may comprise an interface to a computer or computer network. Alternatively or additionally, the printer may comprise a print media sensor configured to acquire a type designation of the loaded print media.

The control unit or regulating unit of the printer may be further configured to receive print data of the at least one print job via the user interface and/or the interface. The control unit of the printer may be further configured to determine a compatibility or incompatibility between at least two of the following: a type designation of the device, the print data of the at least one print job, the type designation of the print medium, and the at least one measurand of the object. The control unit or regulating unit of the printer may be further configured to control or regulate the print head and the platen roller to execute the at least one print job when the compatibility is detected, and/or to output a message of the incompatibility by means of the user interface and/or the interface when the incompatibility is detected.

Determining compatibility or incompatibility may comprise matching the consistency of the respective quantities, data, or data sets.

The printer may further comprise any feature disclosed in the context of the device or a feature corresponding to any feature of the device.

For example, the printer may comprise a writing unit configured to write an identifier into a transponder of the print medium. The identifier may be included in the print data or predetermined by the print data.

Alternatively or additionally, the control unit or regulating unit of the printer may be configured to output, by means of the user interface and/or the interface, the determined success or failure in acquiring and/or reading out the identifier and/or the determined quality and/or a match or deviation between the print data and the acquired and/or read-out identifier determined during comparing (e.g., matching). Alternatively or additionally, the control unit or regulating unit of the printer may be configured to repeat the respective print job and the output of the corresponding printed product in response to the determined failure, a determined quality smaller than a minimum quality and/or the determined deviation.

The type designation of the device may be read out via the data interface (for example, when the printer is switched on or when the device is attached to the printer by means of the mechanical interface).

Optionally, the printer comprises a plurality of unwinders (or spools or reels) each with a print medium, wherein the print media of different unwinders belong to different type designations. The printer may be configured to feed a print medium of the appropriate type designation to the print head in response to the at least one measurand (or measured variable) of the object received via the data interface and using the print medium sensor.

Another aspect relates to a system (also: printing system) for arranging a marking circumferentially closed around a prolate object, preferably around a conductor, or for providing a marking arrangeable circumferentially closed around a prolate object, preferably around a conductor. The system comprises a printer according to one embodiment of the printer aspect (i.e., the second aspect), preferably a thermal transfer printer, for outputting a printed product to a device according to the device aspect. Furthermore, the system comprises the device, wherein the material interface is arranged relative to the printer to receive the printed material output from the printer.

Optionally, the device comprises a print signal interface configured to acquire a control signal for outputting the printed product. The data interface, the sensor (for example the camera) for acquiring printed identification and/or the sensor for acquiring the identification of the transponder (for example the reader unit) may be examples of the print signal interface.

Alternatively or additionally, the device comprises at least one sensor configured to acquire a control signal for providing or arranging the marking. This sensor may initiate the providing or arranging. The at least one sensor for acquiring the control signals of the at least one measurand of the object to be marked may be an example of the sensor for acquiring the control signal for providing or arranging. That is, the control signal of the at least one measurand of the object to be marked may serve as the control signal for the provisioning or the arranging.

The at least one actuator of the device may be configured to arrange the marking on the object in a circumferentially closed manner or to provide the marking for circumferentially closed arrangement, depending on the control signal for outputting the printed product and the control signal for providing the marking by means of the printed product output by the printer.

The device may be a device for providing a marking arranged or arrangeable in a closed circumferential manner around a prolate object, preferably around a conductor.

The device may be configured as an applicator, annex (or stem) or attachment of the printer, especially a thermal transfer printer. The device may be interchangeable. Optionally, each of a plurality of different embodiments of the devices may be attachable to the same printer.

The printer may receive an identifier via an interface (e.g. a network interface or a serial interface), for example as part of the print data of a print job. The printer may be configured to print the received identifier onto a print medium using a printing material. The print media may comprise an ink ribbon, for example for thermal transfer printing. The print medium (i.e., a print-on substrate or print-on material, i.e. a substrate or material to print on) may be a plastic film, for example for heat sealing or welding, or a heat shrink tube. The printed product may comprise the printed medium printed by means of the printing material.

The providing may comprise arranging the marking on the prolate object, preferably arranging the marking circumferentially about a longitudinal axis of the prolate object. The at least one actuator may be configured to circumferentially arrange the printed marking about a longitudinal axis of the object.

For example, the actuator may arrange or provide the marking when the control signal of the print signal interface indicates the output of the printed product at the material interface and the control signal of the sensor indicates the presence of the object or a desired use to provide the marking.

The device and the printer may be arranged side by side, for example without a direct mechanical connection. For example, the printer and device may each be arranged in a stationary and/or non-slip manner on the same work surface. For example, a material interface of the printer may be aligned or overlapping (or congruent) with the material interface of the device. There may be a clear gap between the printer and the device during operation.

The device may further comprise a mechanical interface configured to releasably or irreversibly attach (or fasten) the device to the printer.

The attachment (or fastening) may be irreversible, for example comprising a material connection. Alternatively, the device may be removably attached to the printer, such as being non-destructively detachable and/or attachable and/or detachable without tools.

The at least one sensor of the control signal for providing the marking may be configured to acquire the object, preferably to acquire a presence, a location, and/or a size of the object.

The control signal for providing the marking may indicate the presence (i.e., the presence), the location, and/or the size of the object. The location may comprise a position and/or orientation of the object (for example, a longitudinal axis of the object). The size may comprise a length (for example, along the longitudinal axis), a width, a diameter, and/or a circumference of the object.

The at least one sensor of the control signal for providing the marking may acquire the object without contact.

The at least one sensor of the marking provision control signal may comprise a button. The marking provision control signal may indicate an actuation of the button (also: provision request).

The control signal for providing the marking may indicate a user request for providing the marking. The control signal for providing the marking may be a trigger signal. The actuator may be configured to arrange the marking on the object in a closed-loop manner or to provide the marking in a closed-loop manner in response to acquiring the object and/or acquiring the trigger signal.

The button may be a foot switch or a hand switch.

The print signal interface may comprise a sensor configured to acquire the printed product output by the printer, preferably to acquire a presence, a position, and/or a feed of the output printed product.

The sensor for acquiring the output of the printed product (also: sensor for acquiring the output printed product, or in short: sensor for acquiring the printed product or printed product acquisition sensor) may be arranged at the material interface. The printed product acquisition sensor may acquire the printed product without contact.

The at least one sensor may further comprise a sensor for acquiring the printed product output from the printer. Acquiring the printed product may comprise acquiring a presence, a location (e.g., position and/or orientation), and/or a size (e.g., length and/or diameter) of the printed product.

Alternatively or additionally, the print signal interface may comprise a data interface configured to communicate, preferably bidirectionally, with the printer for providing or arranging the marking.

The at least one actuator may be configured to (for example, in response to acquiring the object and/or the trigger signal) process, in communication with the printer, the printed material output by the printer for marking and arrange or provide the marking on the object for arrangement.

The bidirectional communication may comprise receiving the control signal for outputting the printed product from the printer and sending a control signal for requesting output of the printed product to the printer. For example, the control signal for providing the marking may be forwarded to the printer as a request for output of the printed product via the data interface.

The printer may be configured to deliver the printed product to the device at the material interface, for example, in accordance with bidirectional communication and/or in response to the control signal to provide the marking.

The data interface may be configured for wireless communication, preferably using radio signals, infrared signals, and/or near-field communication.

The data interface may be configured to synchronize or coordinate an alternating and/or event-driven operation of the at least one actuator and the printer to provide or arrange the marking.

For example, a feed (e.g., feed forward) of the printed product executed by the printer may be alternately executed, synchronized and/or coordinated with a cutting, folding and/or turning of the output printed product. The respective sub-steps executed during alternating and/or event-driven operation by the device or the printer for the providing or the arranging of the marking may also be referred to as actions. The coordination of the sub-steps may also be referred to as action coordination.

The data interface may be configured to allow the printer to control the at least one actuator of the device, to read control signals from the at least one sensor and/or the print signal interface of the device, and/or to read an identifier stored in the device.

The at least one actuator of the device may be controllable on the side of the printer using the data interface. Alternatively or additionally, measurands (or measured values) of the at least one sensor of the device may be retrieved (or requested) using the data interface.

The data interface may be electrically connected within the device to the at least one actuator and/or the at least one sensor.

The data interface may be configured to receive control commands for controlling or regulating the at least one actuator from the printer and/or to send control commands for controlling or regulating the printer to the printer based on the control signals from the at least one sensor and/or the print signal interface.

The data interface may be electrically connected to the at least one actuator and/or the at least one sensor within the device via a control unit and/or a regulating unit. The control unit and/or control unit may determine parameters of the applicator from the acquired measured values. The control commands sent to the printer may comprise the parameters and/or control the printer according to the parameters.

The data interface may be configured to send control signals (for example, control commands and/or confirmation messages) from the at least one sensor and/or the print signal interface, and/or parameters determined from the (aforementioned) control signals, to the printer for the providing or the arranging of the marking.

The device may further comprise a control unit or regulating unit configured to control or regulate the at least one actuator of the device depending on the control signals of the at least one sensor, measured values of the printer received via the data interface, confirmation messages of the printer received via the data interface, and/or control commands of the printer received via the data interface for arranging or providing the marking.

The control unit or the regulating unit may be further configured to obtain a control command from the printer via the data interface, execute control or regulation of the at least one actuator in accordance with the control command, and send a feedback to the printer via the data interface in response to completion of execution of the control command.

The feedback may comprise a confirmation of the (for example successful) completion of the execution of the control command or an error message regarding an error during the execution of the control command. For example, the feedback may inform the printer that a defined state of the device has been reached, such as an end position of the at least one actuator.

The control unit or regulating unit may further be configured to determine a parameter of the arranging based on the control signal acquired by means of the at least one sensor, and to send the determined parameter to the printer via the data interface.

The acquired control signal may indicate a diameter or circumference of the object. The determined parameter may specify a length of a feed (e.g., feed forward) or a retraction of the printed product.

A control command sent from the device to the printer via the data interface may initiate the feed (e.g., feed forward) or retraction.

The control unit or regulating unit may autonomously perform the providing or arranging of the marking, or a substep of the providing or the arranging of the marking, in accordance with the control command during the period between obtaining the control command from the printer and sending the feedback to the printer.

The device may further comprise an electrical interface configured to supply electrical power to the device via the printer.

The data interface and/or the electrical interface may be arranged relative to the mechanical interface to contact the printer for communication or supply of electrical power when the device is attached to the printer by means of the mechanical interface.

The data interface may be arranged relative to the mechanical interface to contact the printer for communication when the device is attached to the printer by the mechanical interface. The electrical interface may be arranged relative to the mechanical interface to contact the printer for power when the device is attached to the printer by the mechanical interface. For example, attaching (or fastening) the device to the printer via the mechanical interface may cause contacts of the data interface and/or the electrical interface to close (or to get into contact).

The object may comprise a conductor or be a conductor. The conductor may be a current conductor (or electrical wire) or a light conductor (or optical fiber).

The mechanical interface may comprise a centering pin or an opening for receiving a centering pin and/or a lever and an eccentric connected to the lever in a rotationally fixed manner, which is configured for attaching (or fastening) the device to the printer without screws and/or without tools.

Embodiments of the device enable a modular system (also: printing system) that may be based on a single printer, for example a desktop device, so that this printer may be converted in a short time or few steps to the different applications of object marking, preferably conductor marking. For example, a user may quickly and easily form a system from a normal or application-unspecific label printer for assisting in applying a marking (for example, a label) to the prolate object to be marked, preferably the conductor to be marked.

Herein, the terms application and applying (preferably as a process step) may be interpreted to be synonymous or interchangeable. The terms arrangement and arranging (preferably as a process step) may be interpreted herein to be synonymous or interchangeable.

Applying the marking to the prolate object (preferably to the conductor) may comprise arranging the marking on the prolate object. Providing the marking arranged or arrangeable in a closed manner around the prolate object (preferably around the conductor) may comprise cutting (preferably trimming) the printed product.

The prolate object may be an elongated object. At least in sections, the prolate object may be a (for example general) cylinder, preferably a circular cylinder or a prism.

The prolate object may have a longitudinal axis. An extent of the object in the direction of the longitudinal axis may be greater (for example, several times greater) than one or any extent of the object transverse or perpendicular to the longitudinal axis.

The prolate object may be a conductor, a tube, a vessel, or a housing. The conductor may be an elongated object for conducting signals or substances. For example, the conductor may be an elongated object for conducting electrical current and/or electromagnetic radiation (preferably light). The vessel may be a test tube or a sample tube, for example for holding and/or transporting a fluid.

The conductor may comprise one core or two, at least two, three or more cores (or wires) electrically insulated or optically decoupled from each other. The cores may run parallel to each other or be twisted together (for example in pairs).

The conductor may be a single, multiple, fine and/or superfine stranded conductor.

The conductor may be a cable, cable bundle and/or ribbon cable. The conductor may be a light conductor (also: light guide cable). The conductor may be a tube and/or a fluid line.

The conductor may be a cylindrical body and/or a non-rotationally symmetric elongated body. The conduction of the signals or substances may be directed along a longitudinal axis of the conductor and/or run between ends of the conductor.

By allowing embodiments of the device for a specific application to be attached to a printer that is not specific to the application, special printers for the respective application, and thus costs, may be avoided and/or resources may be used more effectively. For example, a utilization rate of the printer may be increased as a result. The same or further embodiments of the device may reduce a downstream manual effort in mounting the print-on materials on the objects to be marked.

FIG. 1 shows an embodiment of a device generally designated by reference numeral 100 for arranging a marking circumferentially closed around a prolate object or for providing a marking 101 (for example, for output, arrangement and/or application of a marking 101) arranged or arrangeable circumferentially closed around a prolate object 102, preferably around a conductor. The object 102 is preferably a conductor.

The device 100 comprises a material interface 156 configured to receive a printed media 208 output from a printer 200 as a printed product 214. A data interface 158 of the device 100 is configured to communicate with the printer 200 to arrange or provide the marking 101.

The device 100 further comprises at least one sensor 106 configured to acquire control signals that imply or indicate at least one measurand (or measured variable) of the object 102 to be marked. The at least one sensor 106 is in a (for example, direct or indirect) data connection with the data interface 158.

The device 100 further comprises at least one actuator 120 and/or 122 configured to arrange the marking 101 on the object 102 in a closed circumferential manner or to provide the marking 101 for closed circumferential arrangement, according to the communication via the data interface 158 and using the printed product 214 output from the printer 200.

The control signals from the sensor 106, i.e., the control signals relating to the least one measurand (preferably the size) of the object 102 are also referred to as sensor data. The device 100 determines sensor data that may be used to calculate a length (e.g., label length, print length, font size). For this purpose, the device comprises the sensor 106, for example one or more capacitive, inductive, resistive, optical, or similar sensors, optionally coupled to a mechanical system (for example, for fixing or fastening the object).

In a first variant, which may be implemented with any embodiment of the device 100 or printer 200, the sensor data is sent to the printer 200 (for example, to a control unit 230 or regulating unit 230 of the printer 200) via the data interface 158. In the first variant, the control unit 230 or regulating unit 230 of the printer 200 (for example, by running a printer firmware) and/or a computer or computer network 300 connected via the interface 222 (for example, by running an application) may calculate the length.

In a second variant, which may be implemented with any embodiment of the device 100 or printer 200, the calculated length (for example, as a default or parameter of the printing) is sent to the control unit 230 or regulating unit 230 of the printer 200 (for example, to the firmware of the printer 200 executed by the control unit 230 or regulating unit 230) via the data interface 158.

In any variant, the data interface 158 may be configured according to a universal serial bus (USB), according to RS232, I2C, Ethernet.

A conductor, preferably a cable, is an example of the prolate object 102.

The measurand (or measured parameter) may comprise a cable diameter of the cable 102. The cable diameter may be measured to thereby calculate an optimal size of the marking 101 (for example, an optimal label size), preferably by means of control unit 230 or regulating unit 230 of the printer 200. A printed identifier (preferably a label) of the marking 101 is thereby scaled such that the identifier is readable from one side in the state arranged on the cable 102. The cable diameter may be measured when the cable 102 is fixed.

Alternatively or additionally, the cable diameter may be measured as a measurand to check whether the inserted print medium 208 (also: material) matches the cable diameter. This is relevant, for example, in the case of a tube as print medium 208. The cable diameter may be measured when fixing the cable 102.

A sensor 104 of the device 100 may include a reading unit (for example, a read-write unit for RFID) and/or a camera for checking an identifier (also: marking information) of the marking 101. The sensor 104 is integrated in the device 100, for example, in the longitudinal direction of the printed product 214 at or after the material cuts 156.

To achieve optimum quality assurance, the identification may be acquired and checked as visual information by means of the camera after printing. Optionally, an identifier of the transponder (e.g. an auto-ID information) is also read by the reading unit when writing to a transponder (e.g. an RFID tag) integrated in the print medium 208.

The transponder in the print medium 208 may be pre-written on an unwinder 216 of the print medium 208, may be written to by the printer 200 during printing using a write unit 207', or may be written to by the device 100 using, for example, the write reader (which also functions as a sensor 104).

For example, the control unit 130 and/or the control unit 130 of the device 100 and/or the control unit 230 and/or the control unit 230 of the printer 200 checks whether both the printed identification (for example, a label) and an identification of the transponder (for example, RFID information) are readable.

In contrast to conventional verification using an external RFID reader and/or external cameras with image processing, such an embodiment of the device 100 (for example, an applicator for conductor marking) may verify the printed identifier (i.e., optical information) and/or the transponder identifier (for example, an auto-ID information) of the marking 101 by integrating the camera and/or the RFID reader as a sensor 104 in addition to providing or arranging (i.e., applying) the marking 101.

The device may use the at least one sensor 106 to acquire the at least one measurand to determine properties of the object 102 to be marked, such as a hardness and/or an electrical conductivity. The sensor 106 may comprise a capacitive, inductive, resistive, optical, and/or the like sensor optionally coupled to a mechanical system.

The printer 200 uses this information obtained via the data interface 158 (i.e., the least one measurand) to verify that the correct or appropriate object, preferably the correct or appropriate conductor diameter, cable, tube, is inserted into the device 100 for arranging the marking 101.

Preferably, the printer 200 detects the inserted print medium 208 (i.e., the print-on material). For this purpose, the printer 200 comprises a print medium sensor 207 configured to acquire a type designation of the print medium 208. The print medium sensor 207 may be arranged on a circumference of the unwinder 216. Alternatively or additionally, the print medium sensor 207 may be optically (for example, by means of a binary code, a bar code, or other optically readable codes on the print medium 208) and/or wirelessly (for example, by means of transponders integrated in the print medium 208) acquire the type designation of the print medium 208. The transponders may additionally or simultaneously be used to write the identifier of the marking 101. The transponders may be implemented using radio frequency identification (RFID) and/or near field communication (NFC).

The inserted print medium 208 (for example, the acquired type designation) may be matched with print data (for example, of a print job received via the interface 222), preferably executed by the control unit 230 and/or control unit 230 of the printer 200. If the print medium 208 does not match the print data, a message is displayed on a display 209 (preferably a user interface) of the printer and/or on the driving computer 300.

Optionally, the device 100 adjusts to the print medium 208, for example, by sending a diameter or width of a tube as the print medium 208 from the printer 200 (preferably from the control unit 230) to the device 100 (preferably to the control unit 130) via the data interfaces 258 and 158.

Optionally, the device 100 comprises a print signal interface (for example, the sensor generally designated herein by reference numeral 104 and/or the data interface generally designated herein by reference numeral 158) configured to acquire a control signal to output the printed product 214.

The control signal from the sensor 106 may act as a control signal to provide the marking 101.

The actuator 120 and/or 122 may be further configured to arrange the marking 101 on the object 102 in a closed circumferential manner or to provide the marking 101 for closed circumferential arrangement, depending on the control signal for outputting the printed product 214 and the control signal for providing the marking 101 using the printed product 214 output from the printer 200.

Optionally, the device 100 comprises a mechanical interface 152 configured to removably attach the device 100 to a printer 200.

For example, the print signal interface comprises a data interface 158 configured to communicate with the printer 200 for providing the printed marking 101. The control signal for outputting the printed marking 214 may be received by the printer (for example, its controller generally designated by reference numeral 230). Alternatively or additionally, the print signal interface comprises a sensor 104 configured to acquire the output of the printed product 214.

For example, the sensor 106 of the device 100 is configured to acquire the object 102, preferably the conductor 102, (for example, its presence and/or size, preferably width or diameter). Alternatively or additionally, the sensor 106 comprises a pushbutton whose actuation initiates the provisioning.

Through the material interface 156, the device 100 receives the printed material 214 output from the printer 200. The at least one actuator (for example, at least one of the actuators generally designated herein by reference numerals 120 and 122) of the device 100 may be configured (preferably controlled) to provide (for example, arrange) the marking 101 and/or apply (for example, arrange) the marking 101 to the object 102 (preferably the conductor) by means of (i.e., using) the printed material 214 output by the printer 200 in response to communication with the printer 200 (for example, via the data interface 158) and/or acquisition of the object 102 (preferably the conductor), for example, by means of the sensor 106.

For a concise description, and without limitation of the prolate object 102, a conductor is described below as an example of the prolate object 102.

Preferably, the device 100 further comprises an electrical interface 154 for supplying power to the device 100 via the printer 200. Alternatively or additionally, the device 100 may comprise its own power supply, such as a power supply for connection to a power grid or a rechargeable electrical energy storage device (such as a secondary cell).

Optionally, the device 100 comprises a control unit 130 or regulating unit 130 configured to control or regulate the at least one or each actuator (for example, the actuator 120 and/or 122) of the device 100, for example, according to a controlled variable whose actual value is acquired by the sensor 106 as measured values. Alternatively or additionally, the control unit 130 or the regulating unit 130 may be configured to acquire the measured values from the at least one sensor 104 and/or 106 and send them to the printer 200 via the data interface 158. Alternatively or additionally, the control unit 130 or the regulating unit 130 may be configured to receive control commands for controlling or regulating the at least one actuator (for example, the actuator 120 and/or 122) from the printer 200 via the data interface 158 and/or to send control commands for controlling or regulating the printer 200 to the printer 200 based on measured values of the at least one sensor 106.

The printed product 214 may be a printable medium 208 printed by the printer 200. The printable medium 208 may be a printable tape (preferably plastic tape or adhesive tape) or a printable film (preferably plastic film or adhesive film).

The printable film may have a self-adhesive layer on a side opposite the printing, or may be weldable to itself (preferably at an end) and/or to the conductor by the application of heat. Alternatively or additionally, the printable 208 may comprise a tube (for example, a shrink tube).

The first actuator 120 (also: cutting unit) may be configured to cut the printed product 214. The cutting unit may be configured to cut the printed product 214 in a transverse direction 121 transverse, preferably perpendicular, to the longitudinal direction of the printed product 214. Alternatively or additionally, the second actuator 122 may be configured to provide the cut printed product 214, preferably to arrange it on the conductor.

The marking 101 may comprise a portion of the printed product 214, such as a portion of the printed product 214 cut by the device 100 by means of the at least one actuator (for example, 120 and/or 122). The marking 101 may also be referred to as a label.

The marking 101 may be a printed wrap-around label, a printed flag label, or a printed section of the tube.

The application of the marking 101 to the conductor 102 may comprise a material connection of the marking 101 to the conductor 102. For this purpose, the marking 101 may be self-adhesive or bondable by heat. For example, the marking 101 may be a flag label that is wrapped around the conductor 102 during application and connected to itself in a two-dimensional manner at both ends of the marking 101. In another example, the marking 101 may be a wraparound label that is wrapped around the conductor 102 and connected to itself in a two-dimensional manner during application. Alternatively or additionally, applying the marking 101 to the conductor 102 may comprise a positive connection (for example, movable in the longitudinal direction of the conductor) of the marking 101 to the conductor 102. For this purpose, the marking 101 may comprise a tube (for example, a shrink tube) and/or a film (for example, a weldable thermoplastic film) that can be bonded to itself at the ends (preferably by the action of heat).

Applying the marking 101 to the conductor 102 by means of the at least one actuator 120 or 122 may comprise opening the tube and/or sliding the tube (for example the shrink tube) as the marking 101 onto the conductor 102, wrapping the marking 101 around the conductor 102, wrapping the marking 101 around the conductor 102 and closing the marking 101 as a flag label, inserting the marking 101 into a transparent grommet on the conductor 102, and/or printing a tag as the marking 101 that may be clipped around the conductor 102.

The device 100 may be configured to apply the marking 101 to the conductor 102 when the conductor 102 is already mounted (for example, when ends of the conductor are contacted and/or not free ends). For example, during application, the conductor 102 may not be rotated about a transverse axis transverse to the longitudinal direction of the conductor 102, may not be rotated about a longitudinal axis parallel to the longitudinal direction of the conductor 102, and/or may be at rest.

The marking 101 applied to the conductor 102 may be captive. Alternatively or additionally, a printed surface of the applied marking 101 may be flat or substantially free of curvature. For example, the printed surface may be arranged between two embossments. As a result, the printed surface may be easily readable and/or sufficiently large.

The marking 101 may be durable, for example in terms of printing (preferably in that the printer 200 is a thermal transfer printer), in terms of the material of the print medium 208 (for example in that the print medium is a plastic film), and/or in terms of attachment to the conductor 102 (for example in that the marking 101 is positively or adhesively connected to the conductor 102).

A marking 101 may be space-saving, for example, such that a plurality of conductors 102 each carrying such a marking 101 may be closely spaced. Alternatively or additionally, the marking 101 may be displaceable and/or rotatable, for example by the marking 101 being positively connected to the conductor 102. This may allow the marking 101 to be aligned on conductors 102 (such as cables) that are in close proximity to each other.

The first embodiment example of the device 100 shown in FIG. 1 is attached to an embodiment example of the printer generally designated by reference numeral 200. While the embodiment of the printer 200 shown in FIG. 1 is shown and described in connection with the first embodiment of the device 100, the other embodiments of the device 100 may also be attachable (preferably alternately) to the embodiment of the printer 200.

The embodiment of the printer 200 comprises a print head 202, a print roller 204 (or platen roller), a photoelectric sensor 212 for acquiring the print medium 208 (i.e., the material to be printed), for example, for detecting control holes, (for example, black) control marks, a beginning and/or an end of the print medium 208. The printing material 206 is, for example, an ink ribbon.

The material 208 to be printed is guided, along with the ink ribbon 206, between the print head 202 and the platen 204. The photoelectric sensor 212 may acquire a beginning of the print media 208 during printing to ensure positioning of the printed image within the portion of the printed product 214 by means of which the marking 101 is formed.

The printer 200 comprises interfaces that are spatially associated with and/or functionally correspond to the interfaces of the device, respectively. The spatially assigned and/or functionally corresponding interfaces are connected or connectable to each other in pairs.

Preferably, the printer 200 comprises a mechanical interface 252 that is connected to, or is connectable to, or exchanges with, or can exchange with, the mechanical interface 152 of the device 100. Preferably, the spatial association implies that when the mechanical interface 152 and 252 are connected (e.g., interlocked), the other interfaces of the device 100 and the printer 200 are also respectively connected or interchangeable.

Alternatively or additionally, the printer 200 comprises a data interface 258 that is connected to, or is connectable to, or exchanges with, or can exchange with, the data interface 158 of the device 100. Alternatively or additionally, the printer 200 comprises a material interface 256 that is connected to, or is connectable to, or exchanges with, or can exchange with, the material interface 156 of the device 100.

For example, the material interfaces 156 and 256 are in connection, or can exchange, the printed product 214. The data interfaces 158 and 258 are in connection for exchanging measurement data from the respective sensors 104, 106 and/or 212 and/or control commands from the control unit 130 of the device and/or from a control unit 230 of the printer 200.

Optionally, as shown by way of example in FIG. 1, the printer 200 comprises an interface 222 to a computer or computer network 300 (for example, a connection to the Internet). The printer 200 (for example, its controller 230) may receive print jobs via the interface 222.

The device 100 for applying the marking 101 to the conductor 102 is also referred to as an applicator.

An embodiment of applicator 100 (for example, the aforementioned first embodiment of applicator 100) or a system comprising an embodiment of applicator 100 and an embodiment of printer 200 (for example, the aforementioned embodiment of printer) are configured to perform one or more of the following functions and method steps.

The applicator 100 and the printer 200 may perform operations (which are also referred to as actions), i.e., a set of one or plurality of process steps, alternately, in particular when applying the marking 101 to the conductor 102. In doing so, the applicator 100 and the printer 200 communicate with each other via the data interfaces 158 and 258, respectively, for example, in order to coordinate parameters and/or timing of the operations (preferably of the next operation in each case). The alternating execution of the operations is also referred to as interleaved operation of the applicator 100 and the printer 200.

In a first implementation, an overall flow control is stored (e.g., implemented or executably stored) in the printer 200, for example, in the control unit 230 (preferably by means of firmware stored in the control unit 230). The overall flow control may comprise printing on the print medium 208 and applying the printed product 214 resulting from the printing.

A sequence control (or sequence control or sequencing or flow control) of the applicator 100 may be stored (e.g., implemented or executably stored) in the applicator 100 and/or the printer 200. The sequential control of the applicator 100 may comprise (preferably exclusively) applying the marking 101 to the conductor 102 using the printed product 214. For example, the marking 101 is applied to the conductor 102 by executing the flow control of the applicator 100.

In other words, the execution of the sequential control of the applicator 100 may be executed partially or entirely in the applicator 100 or exclusively in the printer 200. In any case, executing the sequential control of the applicator 100 causes the marking 101 to be applied to the conductor by means of the applicator 100.

In a first variant of the first implementation, the flow control of the applicator 100 is stored in the printer 200. The applicator 100 preferably does not have any sequential control, for example, it also does not have a control unit 130. The control unit 230 of the printer (for example, the firmware of the printer 200 in the control unit 230) is configured to (preferably individually) control (or drive) or (preferably individually) interrogate (or acquire) the actuators (for example, 120 and/or 122) and sensors (for example, 104 and/or 106) of the applicator 100 via the data interfaces 158 and 258.

In a second variation of the first implementation, the sequential control of the applicator 100 is stored (e.g., implemented or executably stored) in the applicator 100. For example, the applicator 100 comprises the control unit 130 or the regulating unit 130 in which the sequential control of the applicator 100 is stored (e.g., implemented or executably stored). Preferably, the control unit 130 or the regulating unit 130 is configured to control or regulate the applicator. For simplicity and without limitation, reference is made herein to the control unit 130, i.e., the function of a closed-loop control is optionally comprised.

The execution of the sequential control (preferably in the control unit 130) is started by the printer 200 (for example, the control unit 230, preferably by means of the printer firmware). For this purpose, the applicator 100 may receive a control command via the data interface 158 or be energized via the electrical interface 154. As soon as an operation of the applicator 100 is required, the printer 200 (for example, the control unit 230, preferably by means of the printer firmware) sends a signal as a control command to the applicator 100 via the data interface 258 or 158.

Preferably, the printer 200 waits while the applicator 100 performs the requested operation (for example, initiated by the control command). As soon as the applicator 100 sends (e.g., reports) a signal via the data interface 158 or 258 as a control command of completion of the operation, the printer 200 continues execution of the overall flow control.

Optionally, the signal from the applicator 100 to the printer 200 indicates a status of completion of the operation. For example, the status may indicate successful completion or an error that occurred during execution of the operation.

In a second implementation, the applicator 100, for example the control unit 130 (preferably by means of a firmware of the applicator 100) executes the overall flow. In other words, the overall flow control is stored (e.g., implemented or executably stored) in the applicator 100, for example, the control unit 130 (preferably by means of firmware stored in the control unit 130). By executing the overall flow control, the applicator 100 controls the overall flow.

The printer 200 acts as a slave in the overall operation. For example, the printer 200 has sovereignty over the printed image, i.e., the printer 200 (preferably its control unit 230) performs the printing as an operation of the printer 200 in response to a corresponding control command from the applicator 100. Optionally, the printer 200 issues a control command (i.e., a first start command) to execute the overall flow control, for example, because only the printer 200 knows about the content and/or the presence of a print job.

To implement the interleaved operation, the applicator 100 and the printer 200 exchange information (for example, measurement data and/or control commands) using the data interface 158 and 258, respectively.

The exchanged information may comprise measured values (for example, electrical voltages, electrical currents, electrical frequencies), preferably measured values of the sensor 104 and/or 106, which are transferred (i.e., sent) from the applicator 100 to the printer 200. Alternatively or additionally, measured values of a sensor of the printer (for example, the photoelectric sensor 212) may be transferred (i.e., sent) from the printer 200 to the applicator 100. The applicator 100 or the printer 200 may determine (for example, calculate) sequential control parameters based on the measurands (or measured values) and/or transmit the measurands or the parameters to the computer or computer network 300 (for example, to application software) via the interface 222.

For example, the sensor 106 may acquire a diameter or circumference of the conductor 102 (or the prolate object about its longitudinal axis). The control unit 130 and/or the control unit 230 may determine a length of a feed of the print medium 208 and/or a choice of the print medium 208, for example, depending on the acquired diameter or circumference.

Furthermore, when a defined threshold value is exceeded, these measured values may be transferred as a digital signal (for example, either as a state “0” or a state “1”) to the data interface 158 or 258, respectively, in order to indicate to the other (printer 200 or applicator 100) that a defined state (for example, the completion of an operation) has been reached. For example, reaching an end position or a reference point of an actuator (for example, actuator 120 and/or 122) may be indicated.

A reference move of an actuator of the applicator 100 (for example, the actuator 120 and/or 122) may be used to mechanically move an actuator (i.e., a drive connected to a mechanism of the applicator 100) to a determined position of the actuator (i.e., the mechanism), referred to as a reference position. A control command from the printer 200 or a process step of the operation, sequential control, and/or overall sequential control performed by the applicator 100 may comprise a movement (for example, a travel command) of the actuator, with the reference position serving as a reference point for the movements.

When the control unit 130 of the applicator 100 (for example, the applicator firmware) calculates one or more parameters of the applicator (i.e., the sequential control) from measured values (for example, transferred from the printer 200 or acquired from the sensor 104 and/or 106), this or these may be transferred to the control unit 230 of the printer 200 (preferably to its printer firmware) in accordance with a communication protocol via the data interface 158 and 258. Furthermore, the control unit 130 of the applicator 100 (preferably its applicator firmware) may also use measurement data acquired from the printer 200 (for example, measurement data from the light barrier 212) to control the sequential control of the applicator (for example, as parameters of the applicator).

The printer 200 may be configured to print normal labels, for example, when no device 100 is attached to the mechanical interface 152 and/or the data interface 158.

The printer 200 may be a thermal transfer printer. The thermal transfer printer may provide high contrast and consistent marking 101. For example, the printer 200 may be a thermal transfer roll printer.

The embodiment of the printer 200 comprises an unwinder 216 of the print media 208 disposed upstream of the print head 202, an unwinder 218 of the print media 206 disposed upstream of the print head 202, and a rewinder 220 of the print media 206 disposed downstream of the print head 202.

An electrical interface 254 of the printer 200 is configured to provide electrical power to the applicator 100 attached to the printer via the electrical interface 154 thereof.

Figure 2:
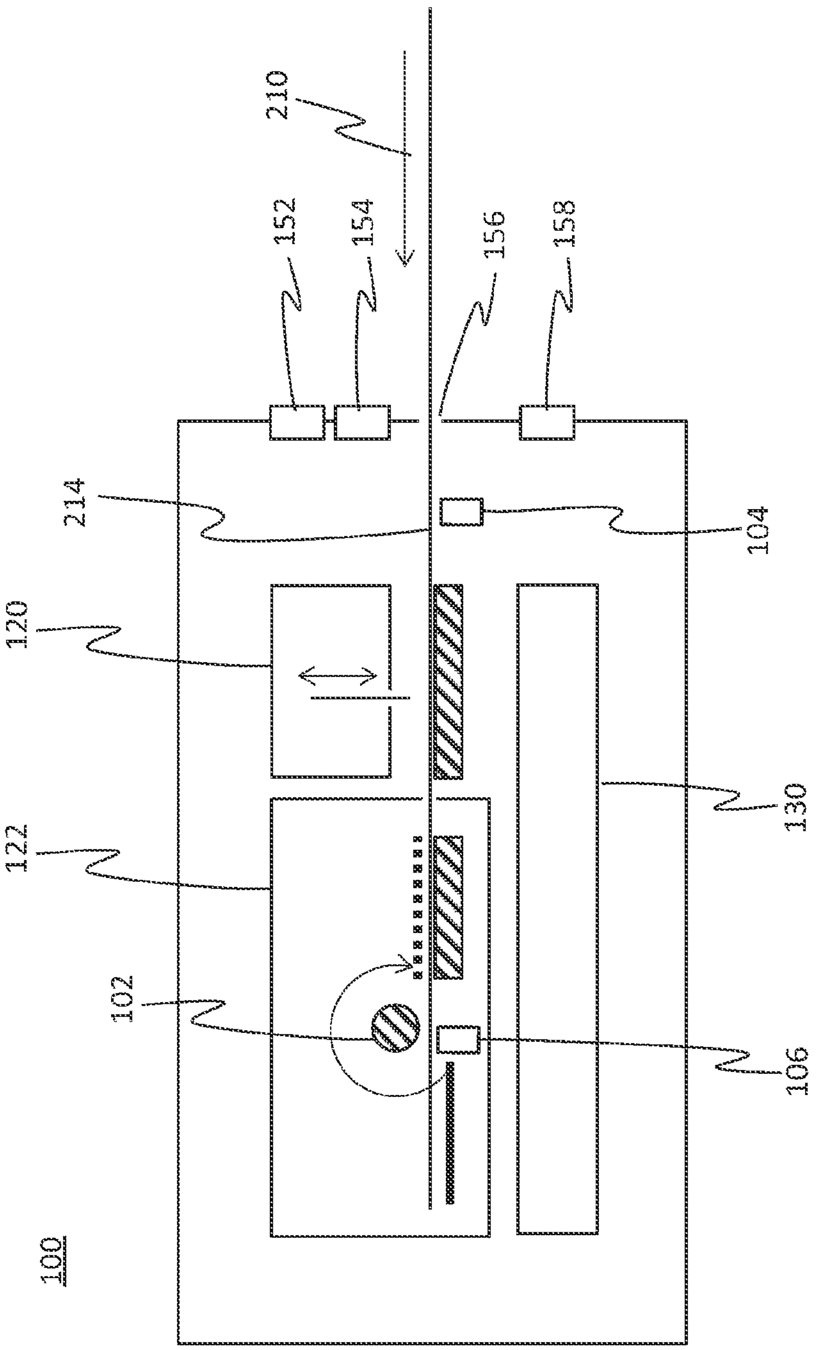
FIG. 2 is a schematic sectional view of a second embodiment of the device for arranging or providing a marking in a first state.
Figure 3A:
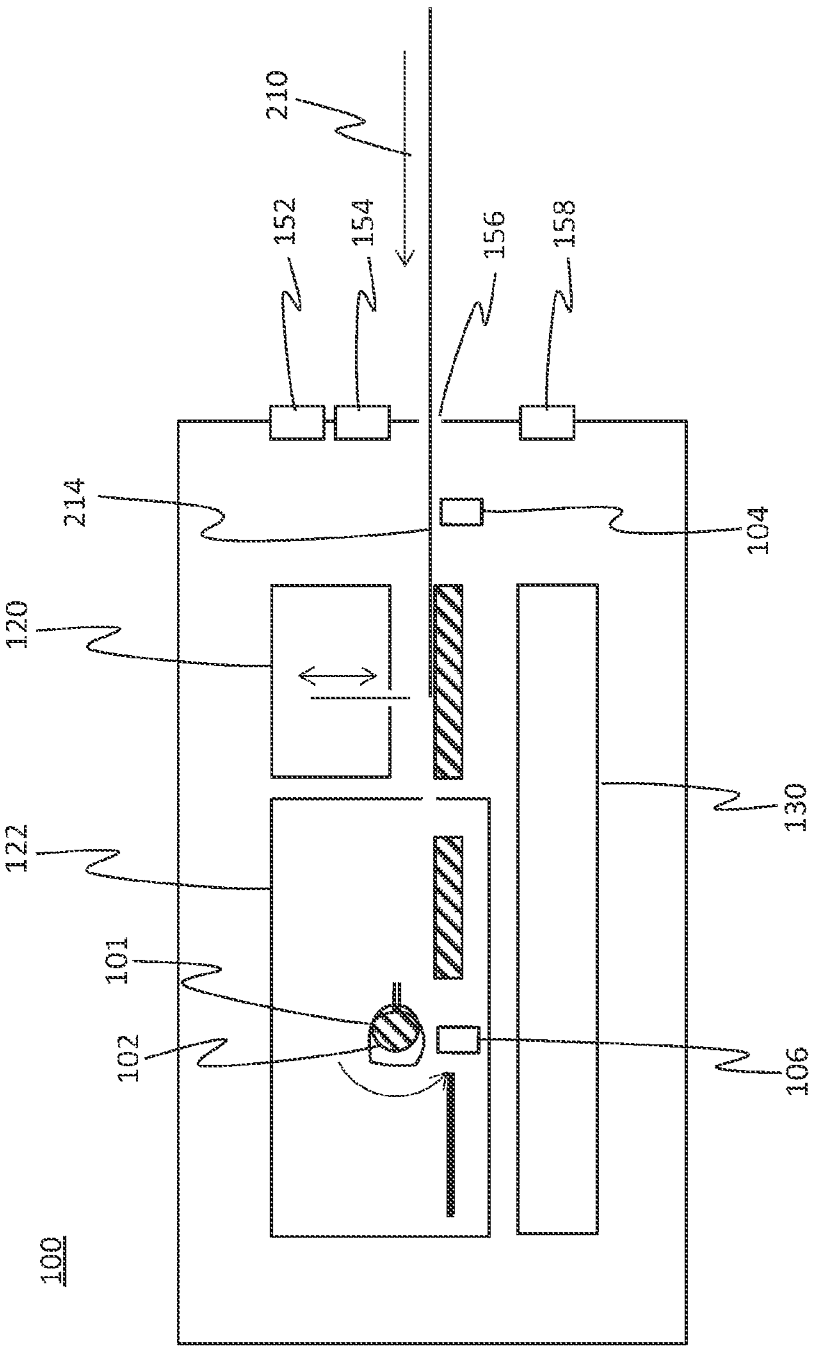
FIG. 3A is a schematic sectional view of a second embodiment of the device for arranging or providing a marking in a second state.

FIGS. 2 and 3A show a schematic sectional view of a second embodiment of the applicator 100 (i.e., the device 100 for applying) a printed marking in a first state and a second state of application, respectively.

The second embodiment of the applicator 100 may be implemented independently or in further variant of the first embodiment of the applicator 100. Features of the first and second embodiments of the applicator 100, denoted by the same reference numerals, may be identical or interchangeable.

The second embodiment of the applicator 100 is configured to strike or fold a printed film as a printed product 214 around the conductor 102 by means of a second actuator 122 of the applicator 100. Preferably, the sensor 106 determines the diameter of the conductor 102. The control unit 130 calculates a length from the diameter and controls the printer (more specifically, its print roller 204) to feed the printed product 214 according to the determined length via the data interface 158.

After the feed, for example in the first state shown in FIG. 1, the printer 200 signals via the data interface 258 (i.e., to the data interface 158) that the feed has been successfully completed, for example that the determined length has been reached. In response to the message from the printer 200, the control unit 130 controls the actuator 122 to wrap or fold the printed product 214 around the conductor 102. Further, the second actuator 122 (or, in one variant, a further actuator) is configured to heat weld together sections of the printed product 214 that lie flat on top of each other. Preferably, a first actuator 120 of the applicator cuts the welded sections to a flush end of the marking 101.

In a first variant of the second embodiment of the applicator 100, a portion of the surface surrounding the conductor 102 is printed and the flush cut end is short compared to the circumference of the conductor 102. Preferably, the applying, i.e., sequential control, of the applicator 100 comprises two embossments performed on the printed product before and after the printed portion by means of the actuator 120, as schematically shown in FIG. 3A.

For example, the flow control of the applicator 100 may comprise at least one of the following operations or steps. In one step, a control command is sent from the control unit 130 to the printer 200. The control command specifies the feed rate of the printed product 214 for a reference cut. In another step, in response to a notification of completion of the feed from the printer 200 to the applicator 100, the reference cut is executed by the actuator 120. A further step of the sequential control of the applicator 100 may comprise waiting until the presence of the conductor 102 is acquired by means of the sensor 106. Another step of the sequential control of the applicator 100 may comprise acquiring the diameter of the conductor 102 by means of the sensor 106 and calculating parameters of the apply (for example, partial lengths for feeds of the printed product 214).

In a further step, a further control command is sent from the control unit 130 to the printer 200. The further control command specifies a first partial feed of the printed product 214 for a first embossing. In a further step, in response to a notification of completion of the first partial feed from the printer 200 to the applicator 100, the first embossing is performed by the actuator 120.

In a further step, a further control command is sent from the control unit 130 to the printer 200. The further control command specifies a second partial feed of the printed product 214 for a second embossing. In a further step, in response to a notification of completion of the second partial feed from the printer 200 to the applicator 100, the second embossing is performed by the actuator 120.

In a further step, a control command is sent from the control unit 130 to the printer 200 indicating a partial feed of the printed product 214 for a cut position. In a further step, in response to a notification of completion of the partial feed for the cut position from the printer 200 to the applicator 100, the cut is made by the actuator 122 wrapping or folding the printed product around the conductor 102, sealing portions of the printed product 214 brought into contact with each other in a planar manner, and executing a cut by the actuator 120.

Figure 3B:
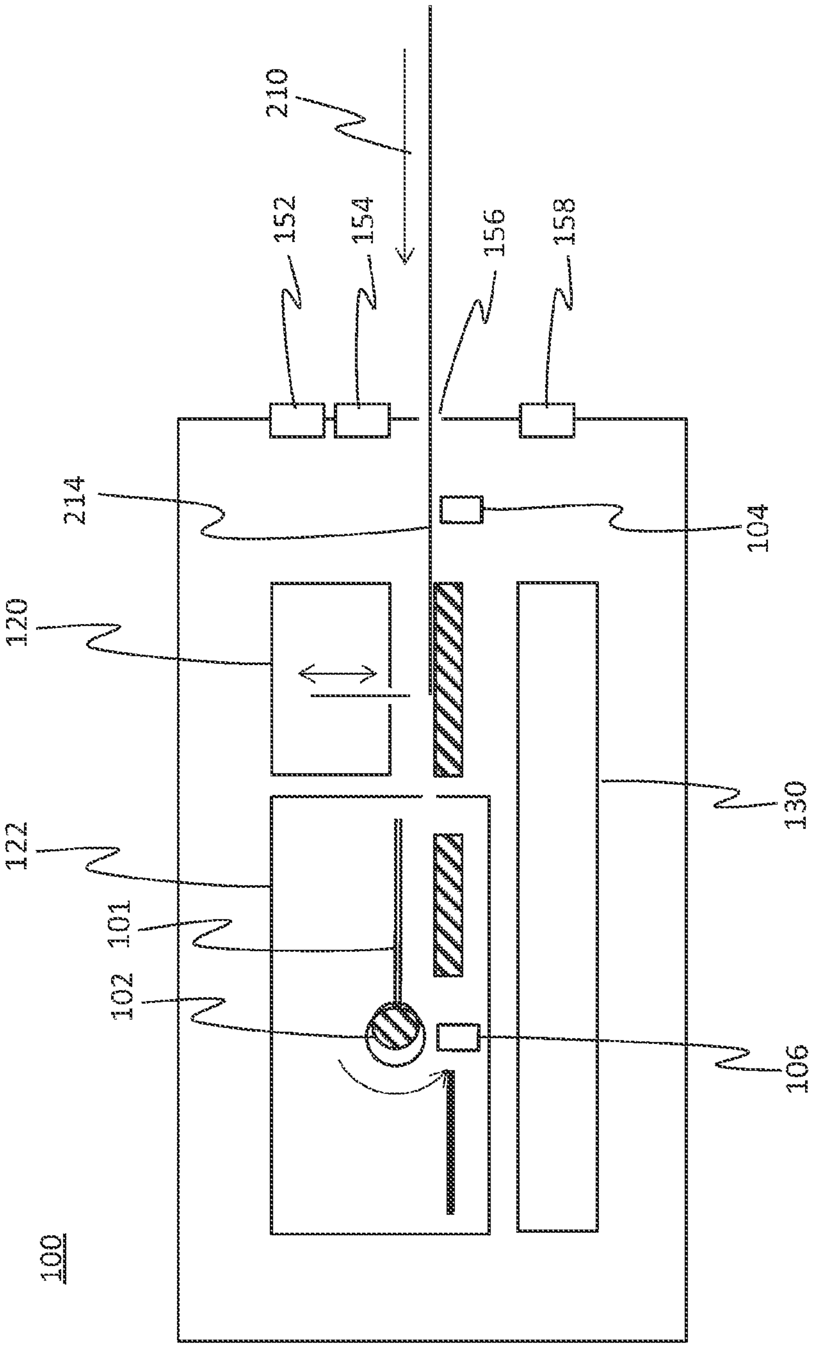
FIG. 3B is a schematic sectional view of a variant of the second embodiment of the device for arranging or providing a marking in a second state.

In a second variant of the second embodiment of the applicator 100, the flush cut end is equal to or longer than the diameter of the conductor 102 and comprises the printed portion of the printed product 214, as schematically shown in FIG. 3B.

Figure 4:
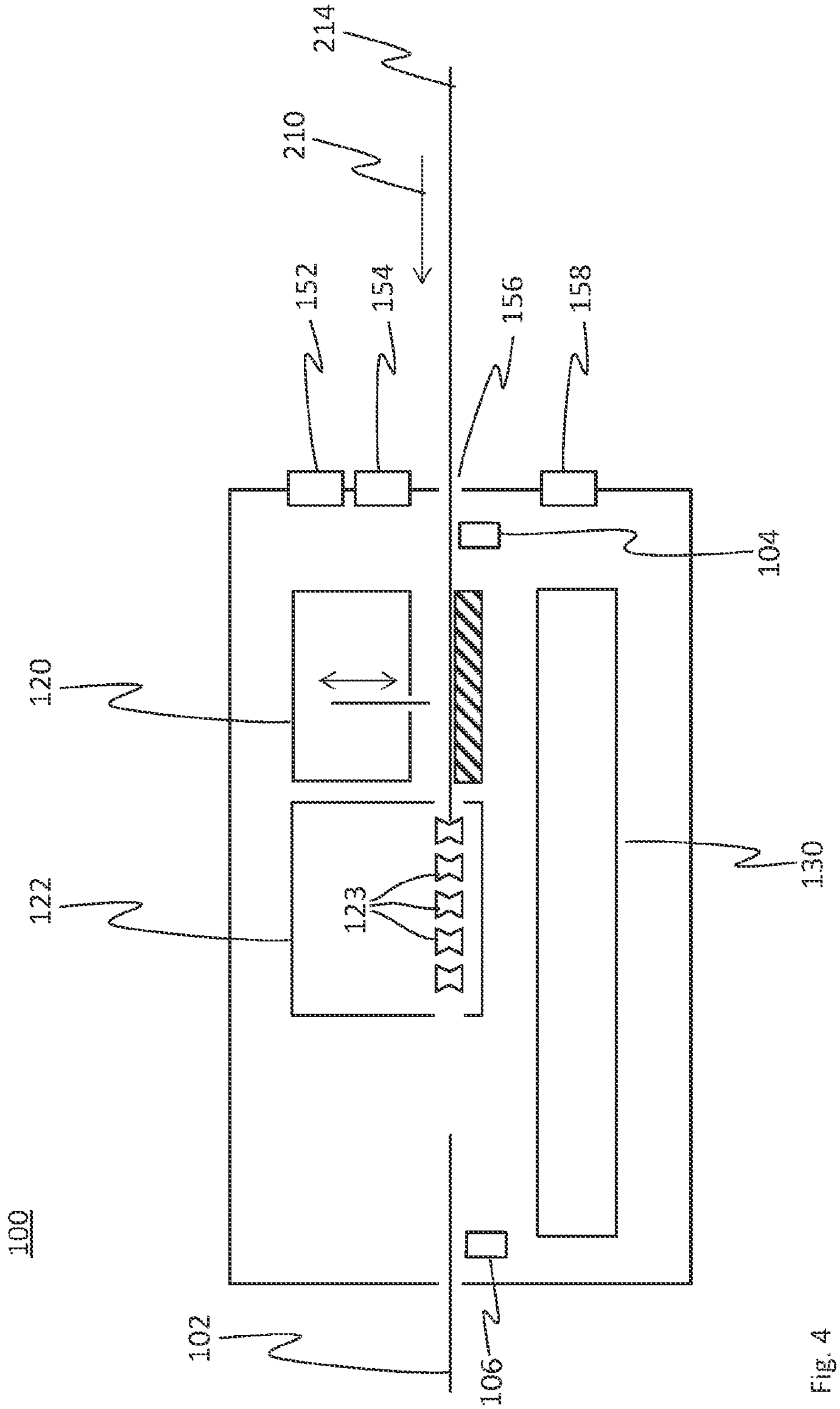
FIG. 4 is a schematic sectional view of a third embodiment of a device for arranging or providing marking in a first state.
Figure 5:
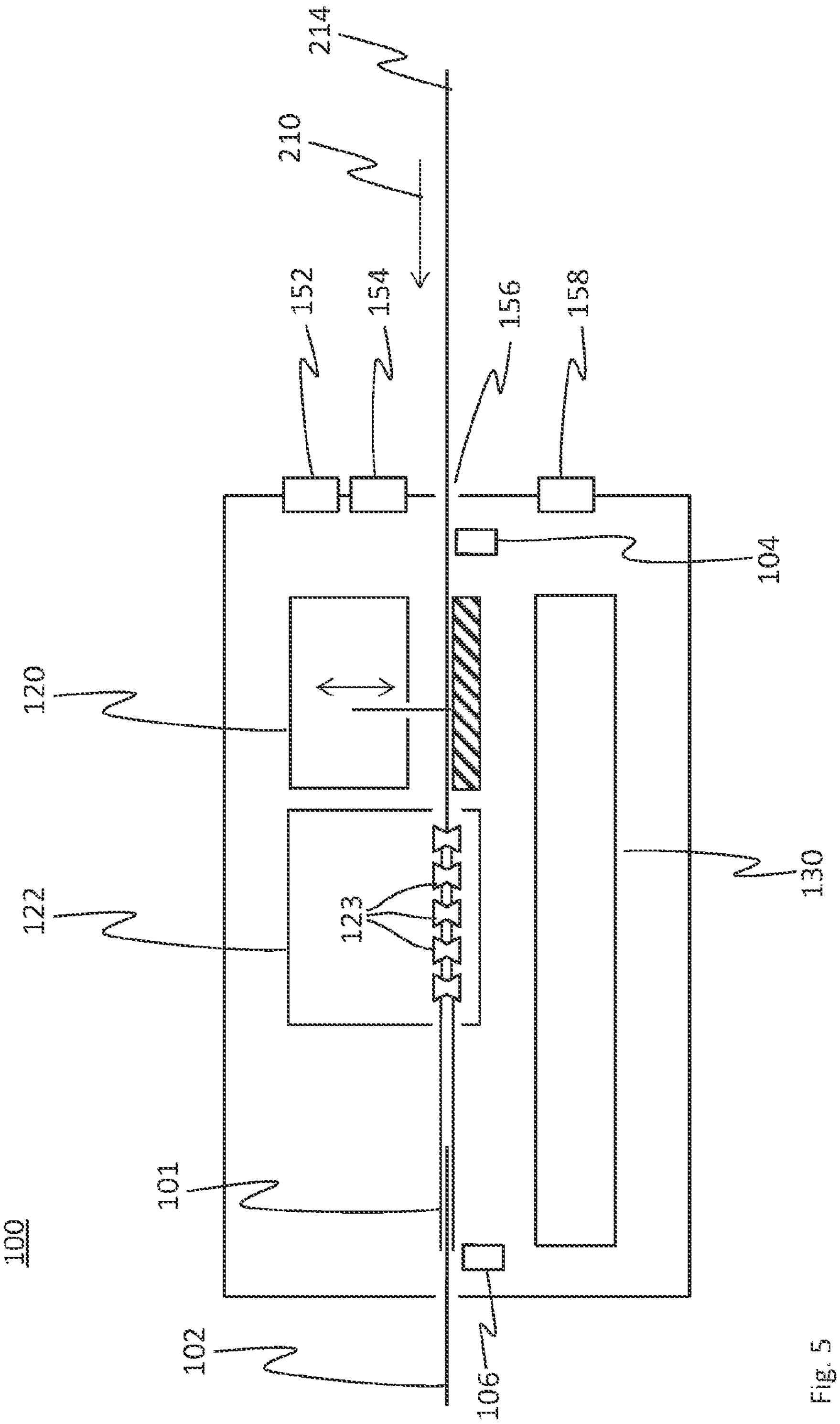
FIG. 5 is a schematic sectional view of a third embodiment of a device for arranging or providing marking in a second state.

FIGS. 4 and 5 show a schematic cross-sectional view of a third embodiment of the applicator 100 (i.e., the device 100 for applying) a printed marking in a first state and a second state of application, respectively.

The third embodiment of the applicator 100 may be implemented independently or in further embodiment of the first and/or second embodiment of the applicator 100. Features of the first, second, and third embodiments of the applicator 100 designated by the same reference numerals may be identical or interchangeable.

The third embodiment of the applicator 100 is configured to slide or attach a tube (for example, a heat-shrink tube) as a print medium 208 or a printed tube as a printed product 214 onto the conductor 102. When the tube is printed and/or cut (for example, by means of the first actuator 120 of the applicator), the tube is pressed flat, whereby its cut end or at least a portion of the printed tube may be closed, i.e., the cut edge or the inner sides of the tube adhere to each other.

The second actuator 122 (also: opening unit) is configured to open the adhering cut edge of the printed tube and/or the adhering inner sides (for example, an upper tube half and a lower tube half) of the printed tube. To this end, the second actuator 122 comprises waisted rollers 123 that apply a force in pairs to opposite lateral edges of the printed tube 214 to open the cut edge of the tube and/or to release the inner sides of the tube from each other. In the schematic illustration of FIGS. 4 and 5, one of each of the pairs of oppositely disposed rollers 123 is visible as the pairs are aligned perpendicular to the longitudinal direction or direction of movement 210.

In the second state shown in FIG. 5, the printed tube is opened by means of the second actuator 122, pushed onto the conductor as a marking 101 due to a feed of the printer 200, and cut off at the end by means of the first actuator 120.

Figure 6:
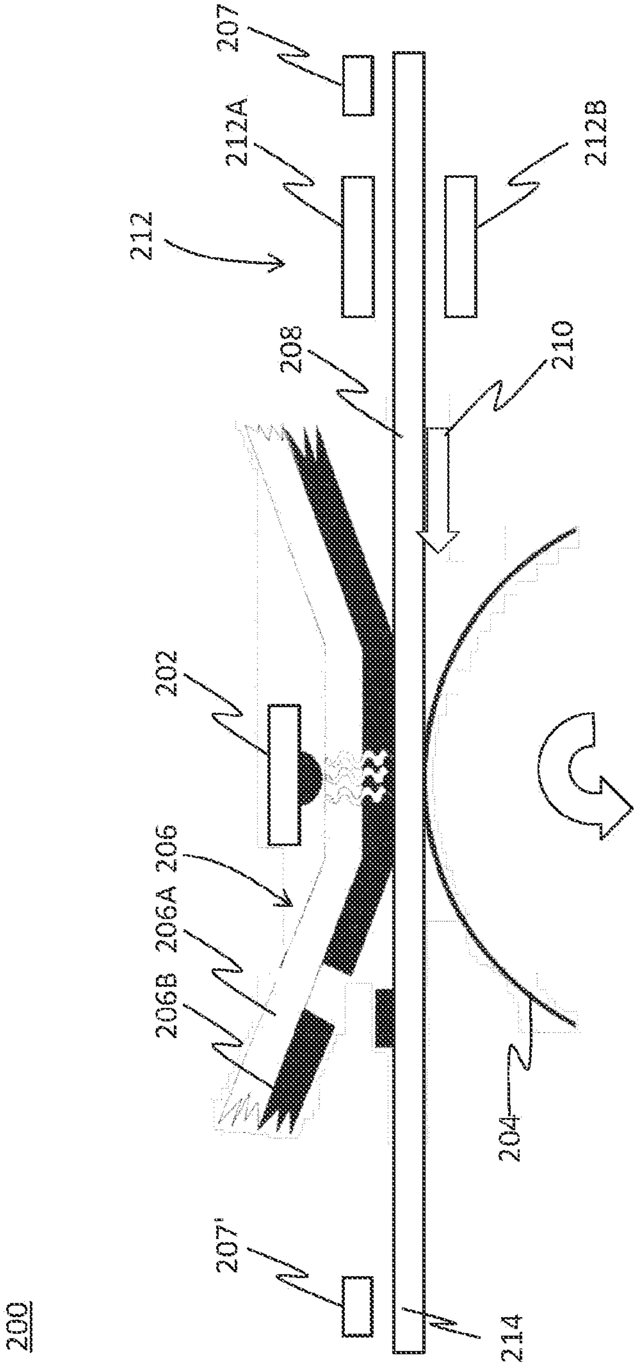
FIG. 6 is a schematic sectional view of an embodiment of a printer as a thermal transfer printer.

FIG. 6 shows a further embodiment of the printer 200, which may be implemented independently or as a further development of the embodiment of the printer 200 described in the context of FIG. 1. Features of the embodiments designated by the same reference numerals may be identical or interchangeable. The further embodiment of the printer 200 is an example of a thermal transfer roll printer.

A control unit 230 of the printer 200 controls a feed and/or a retraction of the print medium 208 at the print head 202 and/or of the print product 214 at the material interface 256 (and consequently at the material interface 156 of the device 100), depending on the signals from the photoelectric sensor 212 and/or control commands obtained from the device 100 via the data interface 258 (i.e., via the data interface 158 of the device 100). For this purpose, the control unit 230 may control a drive (for example, a stepper motor) for rotating the print roller 204.

The light barrier 212 may be arranged upstream of the print head 202 and/or the platen roller 204, with respect to a direction of movement 210 of the print medium 208 during advancement. The light barrier 212 may comprise, as exemplarily shown in FIG. 6, a light source 212A on the side of the print head 202 and a light sensor 212B on the side of the print roller 204. In a first variation, the positions of light source 212A and light sensor 212B may be interchanged. In a second variation, light source 212A and light sensor 212B may be arranged on the same side for acquiring the print medium 208 in reflection.

The print head 202 comprises a plurality of heating elements. When the heating elements are heated (for example, energized) and the print roller 204 applies a predetermined (for example, sufficiently large) pressure to the print medium 208, the ink pigments are transferred from the printing material 206 (for example, an ink ribbon) to the material to be printed. The control unit 230 may control the stepper motor to rotate the print roller 204 and control the energization of the heating elements of the print head 202.

The printing material 206 may comprise a plurality of layers. For example, the printing material 206 may comprise a carrier material 206A (for example, a carrier film) facing away from the print medium 208 and a color layer 206B (for example, a color wax) facing toward the print medium 208.

The printer 200 is preferably a tabletop device to which the device 100 may be attached as an interchangeable module, for example, specific to an application or for the duration of a unified application operation.

Figure 7A:
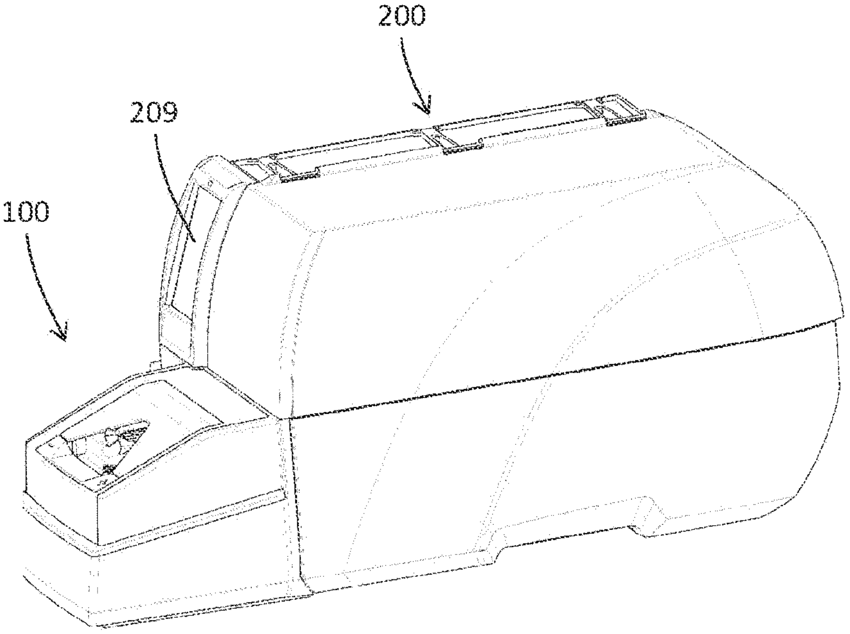
FIG. 7A is a schematic perspective view of an exemplary printing system comprising an embodiment of the printer and an embodiment of the device for providing a marking in a mounted (or attached) position.
Figure 7B:
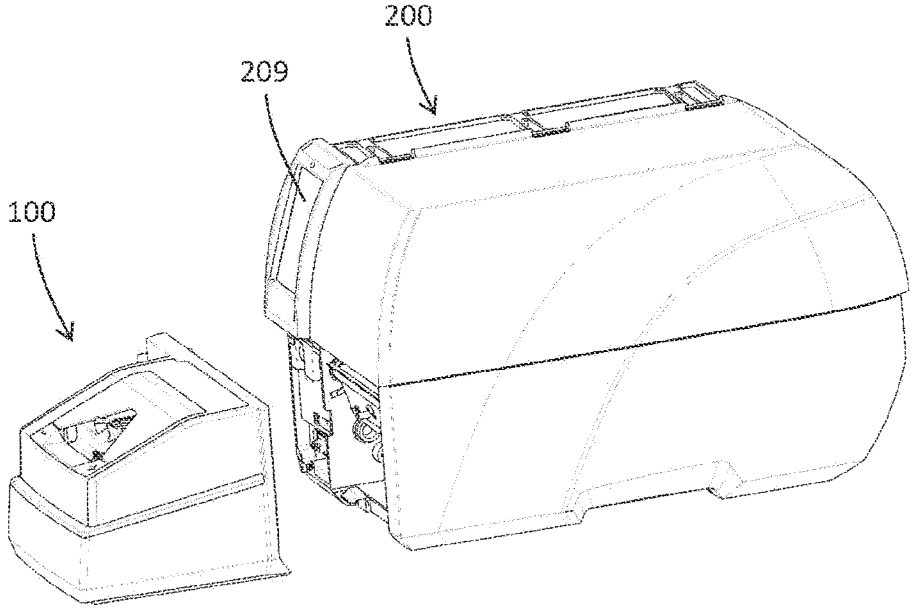
FIG. 7B is a schematic perspective view of the exemplary printing system of FIG. 7A in a disassembled (or detached) position.

FIG. 7A shows a schematic perspective view of an exemplary printing system (system for short), comprising an embodiment of the printer 200 and an embodiment of the device 100. In an exemplary mounted position of the device shown in FIG. 7A, all implemented physical interfaces are connected due to the arrangement of the device 100 on the printer 200. FIG. 7B shows a schematic perspective view of the exemplary printing system of FIG. 7A in a disassembled position. The physical interfaces are exposed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Device for providing a marking, for example applicator 100
Marking (e.g., a label) 101
Prolate object, preferably conductor (e.g., cable),
for example copper conductor or light conductor 102
Printing signal interface of a control signal for outputting printed product,
for example sensor for detecting the printed product 104
Sensor of a control signal for providing the marking,
for example sensor for detecting the object or
sensor for detecting a provisioning request 106
First actuator of the device, for example cutting unit 120
Transverse direction 121
Second actuator of the device 122
Waisted rolls of the second actuator 123
Control unit or regulating unit of the device 130
Mechanical interface of the device 152
Electrical interface of the device 154
Material interface of the device 156
Data interface of the device 158
Printer, for example thermal transfer printer 200
Print head of the printer 202
Platen roller of the printer 204

Printing material, for example ink or color ribbon 206
Carrier or support material of the printing material, for example carrier foil 206A
Color layer of the printing material, for example color wax 206B
Print medium sensor 207
Writing unit for transponder in print medium 207'
Print medium of the printer (also: print-on or imprinting material) 208
Display, preferably user interface, of the printer 209
Feed direction or longitudinal direction of the print medium 210
Light barrier of the printer 212
Light source of the light barrier 212A
Light sensor of the light barrier 212B
Printed product of the printer 214
Unwinder of the print medium 216
Unwinder of the printing material 218
Rewinder of the printing material 220
Data interface of the printer 222
Control unit of the printer 230
Mechanical interface of the printer 252
Electrical interface of the printer 254
Material interface of the printer 256
Data interface of the printer 258
Computer or computer network 300

The invention claimed is:

1. A device for arranging a marking circumferentially closed around a prolate object, or for providing a marking arrangeable circumferentially closed around a prolate object, comprising:

a material interface configured to receive a print medium printed by a printer as a printed product;

a data interface configured to communicate with the printer for arranging or providing the marking;

at least one sensor configured to acquire control signals that imply or indicate at least one measurand of the object to be marked, the at least one sensor being in data communication with the data interface; and at least one actuator configured to arrange the marking on the object in a circumferentially closed manner, or to provide the marking for circumferentially closed arrangement, in accordance with the communication via the data interface and by the printed product output by using the printer, wherein the device and the printer are arranged side by side without a direct mechanical connection, or the device further comprises a mechanical interface configured to attach the device to the printer.

2. The device of claim 1, further comprising:

a control unit and/or a regulating unit, via which the at least one sensor is in data connection with the data interface, and which is configured to calculate a length from the control signals of the at least one measurand of the object as a calculated length and to send the calculated length to the printer via the data interface.

3. The device of claim 2, wherein the control signals sent to the printer via the data interface regarding the at least one measurand of the object or the calculated length sent to the printer via the data interface comprise a specification of the printed product of the printer received at the material interface and/or control or specify a selection of the print medium and/or a printing material used for printing on the print medium.

4. The device of claim 2, wherein a font line of the arranged or arrangeable marking is aligned parallel to a longitudinal axis of the prolate object, and a font height of the font line is scaled with the at least one measurand of the object or the calculated length and/or is smaller than or equal to the at least one measurand of the object.

5. The device of claim 4, wherein the prolate object comprises a conductor.

6. The device of any claim 1, wherein the sensor signals for measuring the object and/or the calculated length control or indicate a length of the marking, a printing length on the printed product, and/or a font size on the printed product.

7. The device of claim 1, wherein the at least one measurand of the object comprises a diameter and/or circumference of the object.

8. The device of claim 7, wherein the object comprises a conductor.

9. The device of claim 1, wherein the at least one sensor is configured to capacitively, resistively, and/or optically acquire the at least one measurand of the object to be marked.

10. The device of claim 1, further comprising:

a mechanism configured to fix the prolate object in spatial association with the at least one actuator for the arranging of the marking, wherein the at least one sensor is configured to acquire the at least one measurand of the object to be marked based on a position of the mechanism.

11. The device of claim 1, wherein the at least one sensor is configured to acquire a mechanical hardness and/or an electrical conductivity of the prolate object, and wherein the at least one measurand comprises the mechanical hardness and/or the electrical conductivity.

12. The device of claim 11, wherein the prolate object comprises a conductor.

13. The device of claim 1, further comprising:

a sensor configured to acquire an identifier printed by the printer on the print medium on the print product received at the material interface.

14. The device of claim 13, wherein the at least one sensor for acquiring and/or reading the identifier is in data connection with the data interface.

15. The device of claim 14, further comprising:

a control unit and/or a regulating unit, via which the at least one sensor for the acquiring and/or the reading of the identifier is in data connection with the data interface, and which is configured to determine success or failure of the acquisition and/or reading and/or to determine a quality of the acquired and/or read identifier, and to send the determined success or failure and/or the determined quality to the printer via the data interface.

16. The device of claim 13, wherein the sensor comprises an optical sensor.

17. The device of claim 1, wherein the printed material further comprises a transponder and the device further comprises a sensor configured to wirelessly, read an identifier of the transponder at a material interface.

18. A printer for outputting a printed product to the device of claim 1 for arranging a marking circumferentially closed around a prolate object, or for providing a marking that is arrangeable around a prolate object, in a circumferentially closed manner, the printer comprising:

a material interface configured to output a print medium printed by the printer as a printed product;

a data interface configured to communicate with the device for arranging or providing the marking; and a control unit configured to acquire control signals communicated via the data interface from at least one sensor of the device, the control signals implying or indicating at least one measurand of the object to be marked, or configured to acquire the at least one measurand of the object to be marked communicated via the data interface; and a print head and a print roller controlled or regulated by the control unit or regulating unit to print on a print medium inserted into the printer in accordance with the communication via the data interface and to output the print medium as a printed product at the material interface.

19. The printer of claim 18, further comprising:

a user interface; and/or an interface to a computer or computer network; and/or a print medium sensor configured to acquire a type designation of the inserted print medium, wherein the control unit or regulating unit is further configured to:

receive print data on at least one print job via the user interface and/or the interface, determine a compatibility or incompatibility between at least two of the following: a type designation of the device, the print data of the at least one print job, the type designation of the print medium, and the at least one measured of the object, and upon determination of the compatibility, controlling or regulating the print head and the print roller to execute the at least one print job, and upon determination of the incompatibility, outputting a message of the incompatibility by the user interface and/or the interface.

20. A system for arranging a marking circumferentially closed around a prolate object, or for providing a marking arrangeable around a prolate object, in a circumferentially closed manner, the system comprising:

the printer of claim 18 for outputting a printed product to the device; and the device, wherein the material interface is arranged relative to the printer to receive the printed material output from the printer.

* * * * *